United States Patent [19]
Longuemare, Jr. et al.

[11] 3,778,829
[45] Dec. 11, 1973

[54] GUARDED MONOPULSE RADAR SYSTEM

[75] Inventors: R. Noel Longuemare, Jr., Ellicott City; David H. Mooney, Jr., Arnold, both of Md.

[73] Assignee: Westinghouse Electric Corporation, Pittsburgh, Pa.

[22] Filed: Feb. 18, 1972

[21] Appl. No.: 227,542

[52] U.S. Cl............................................... 343/16 M
[51] Int. Cl............................................... G01s 9/22
[58] Field of Search .................................. 343/16 M

[56] References Cited
UNITED STATES PATENTS

| | | | |
|---|---|---|---|
| 3,239,836 | 3/1966 | Chubb et al................. | 343/16 M X |
| 3,710,389 | 1/1973 | Heeren........................ | 343/16 M X |
| 3,710,390 | 1/1973 | Krienheder.................. | 343/16 M |
| 3,696,416 | 10/1972 | Badiano et al.............. | 343/16 M X |

*Primary Examiner*—T. H. Tubbesing
*Attorney*—F. H. Henson et al.

[57] ABSTRACT

A Guarded Monopulse Radar System is disclosed for generating azimuth and elevation difference (or error) signals proportional to the angular displacement of the detected radar target from the antenna boresight axis and for generating a sum signal indicative of the target range. The azimuth and elevation difference signals are modulated in quadrature with sine and cosine signals of a reference frequency. The modulated signals are then added to a portion of the sum signal to provide a composite signal. The aforementioned steps are performed at microwave frequencies and the resultant signals are subsequently converted to IF signals by "beating" with a signal derived from a local oscillator. IF signals corresponding to the sum signal and the composite signal are amplified in a circuitry including fast, automatic gain control (AGC). The amplified signals are then demodulated in accordance with the reference signal to provide signals indicative of azimuth and elevation errors.

8 Claims, 9 Drawing Figures

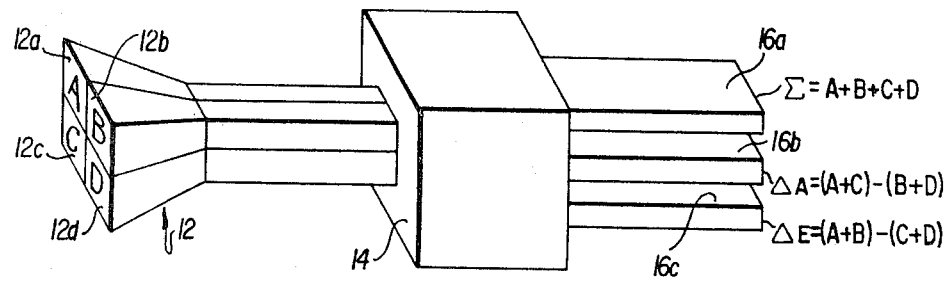
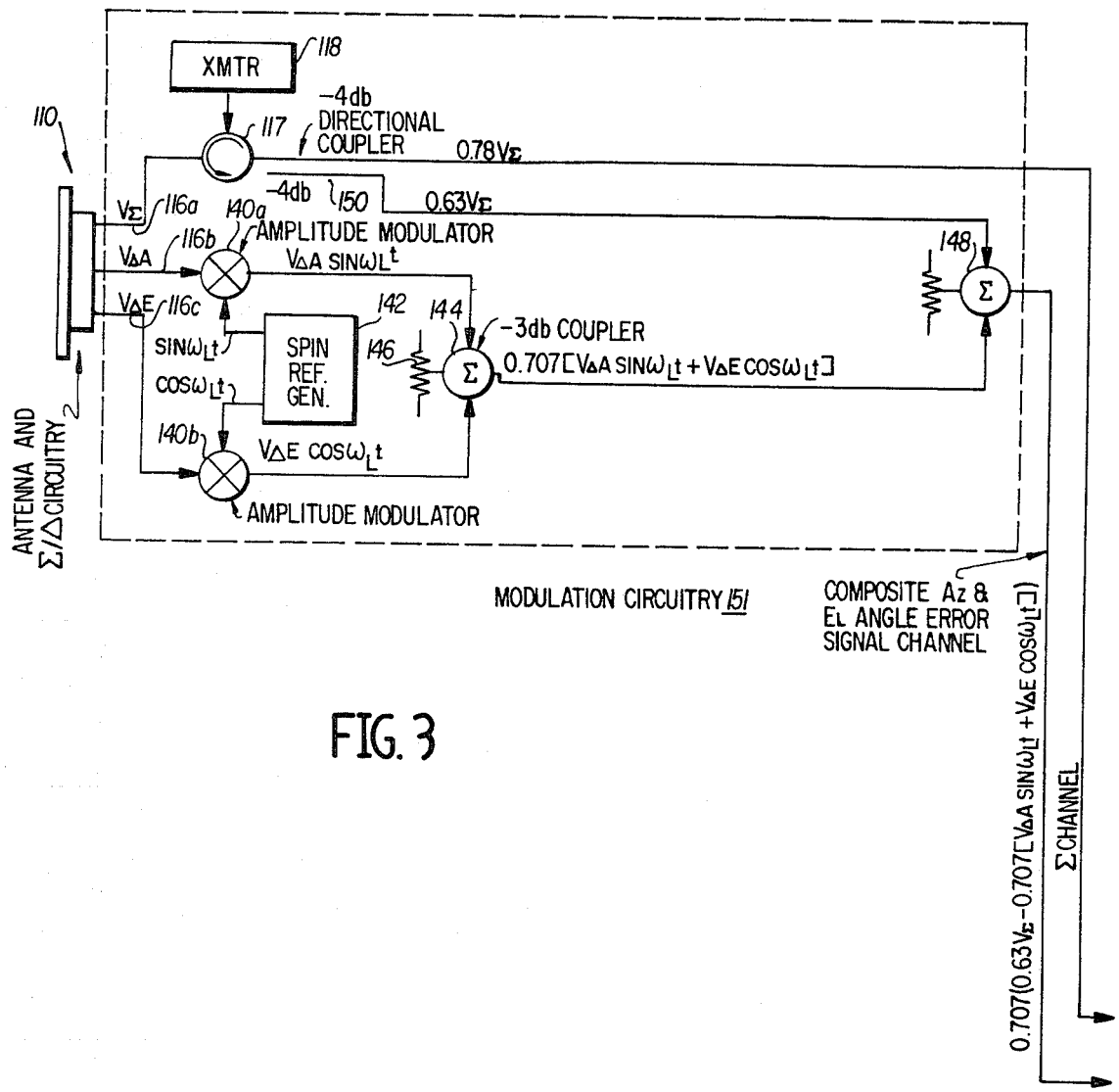

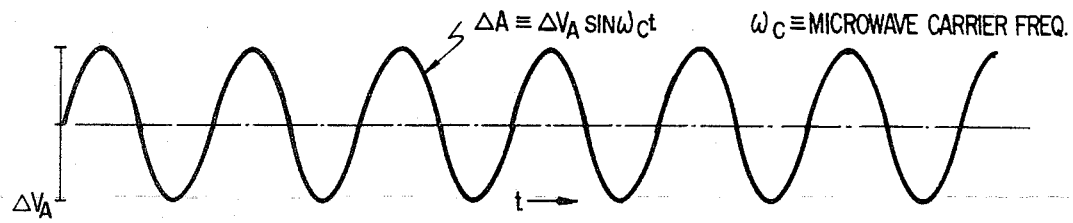
FIG. 5a
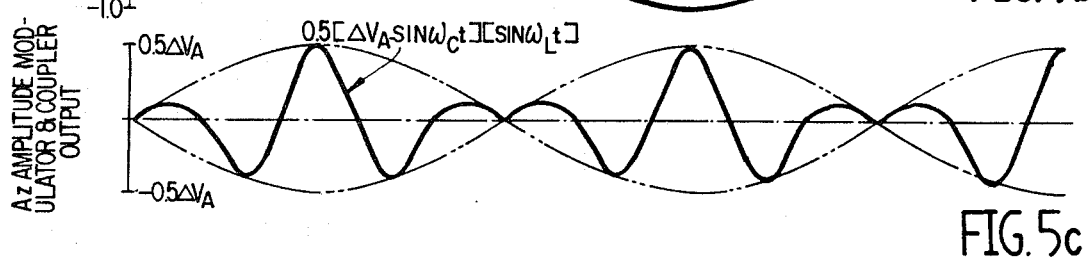
FIG. 5b
FIG. 5c
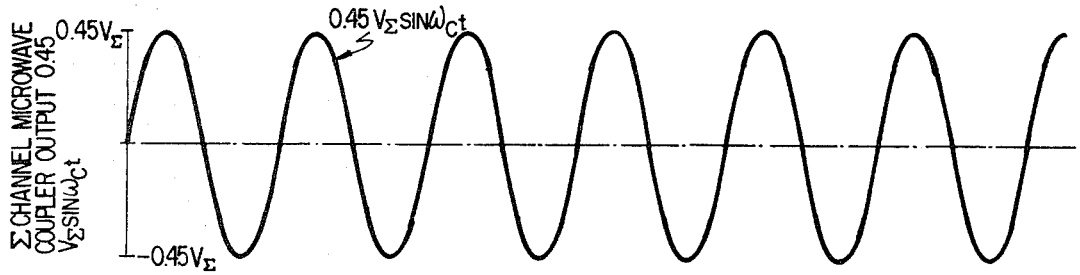
FIG. 5d
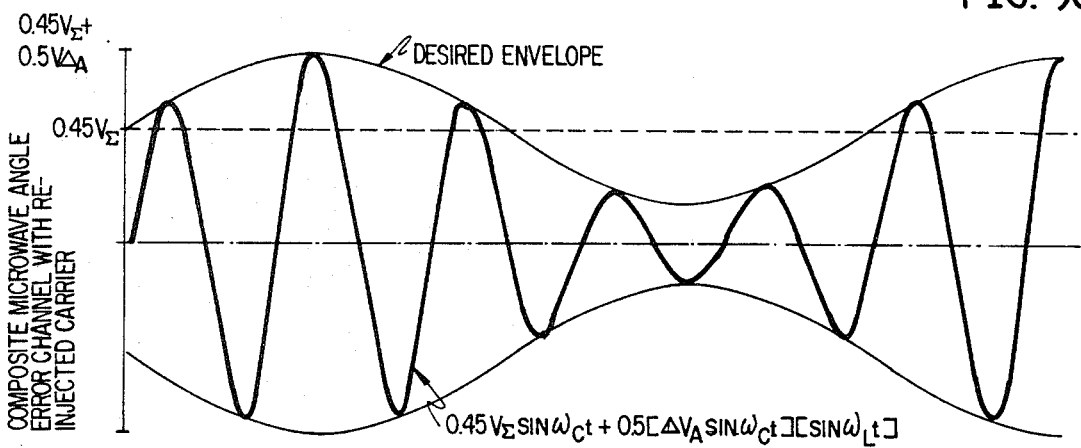
FIG. 5e

GUARDED MONOPULSE RADAR SYSTEM

BACKGROUND OF THE INVENTION

1. Field of the Invention

This invention relates to radar systems and in particular to guarded monopulse radar systems for producing azimuth and elevation signals indicative of the angular displacement of a radar target from the antenna boresight axis.

2. Description of the Prior Art

In the prior art, radar tracking systems such as beam lobing systems and monopulse systems are known. The fundamental difference between these types of systems resides in the instantaneous antenna pattern used and the signal processing techniques. In both of these systems, an error signal (or signals) is generated to indicate the angular displacement of the radar target from the antenna boresight axis. Such an error signal can then be used to control suitable servo drive systems to move the antenna in a direction to null the detected error. Typically, at least two signals are generated to provide an indication of the detected error in terms of at least two orthogonal coordinates in order to mechanize a practical, non-interacting servo system.

Typically, a monopulse radar system operates to provide error signals indicative of the degree of angular displacement in azimuth and in elevation of the target from the reference direction. Such signals may appear in the form of signal ratios which may be obtained by comparing pairs of received signals detected by respective pairs of antenna elements that are displaced in the horizontal and vertical planes, or an equivalent antenna array.

In comparing performance, a properly mechanized monopulse system has a significant advantage over the various lobing systems, i.e. immunity to amplitude fluctuations of the radar signal emanating from the target. These signal fluctuations can be of natural origin such as those resulting from target scintillation or can result from intentional amplitude modulation, e.g., angle track ECM jamming repeaters. In contrast, lobing systems are intrinsically simpler and can provide excellent angle tracking under many conditions with only a single receiving channel, whereas most monopulse systems require at least three identical channels. Such monopulse systems require accurate preservation of the relative phase angle of the signals transmitted through the plurality of channels, in the microwave portion and in at least a part of the IF portion of a typical radar receiver. This problem is greatly aggravated in high performance doppler radars which utilize highly selective filters to separate the desired target return signal from other clutter or interfering signals. Typically, these filters introduce large phase shifts which are usually difficult to match in each of the multiple channels of the system. Typically, such systems require means for automatic phase correction thus increasing the overall complexity of the system.

In a prior art monopulse system known as the Sum and Difference System and illustrated in FIG. 1, four signals are developed by two pairs of horizontally and vertically displaced antenna elements $12a$, $12b$, $12c$ and $12d$ of an antenna array 12 and are combined additively and subtractively in a sum and difference network 14 to produce an azimuth difference signal $\Delta_A$, an elevation difference signal $\Delta_E$ and a sum signal $\Sigma$ upon the output waveguides $16b$, $16c$ and $16a$, respectively.

Each of these three signals is a composite function of the azimuth and elevation displacement angles, and may be processed in a system shown in FIG. 2. A three-part circulator 17 is inserted within the waveguide $16a$ for coupling selectively a transmitter 15 to the antenna and $\Sigma/\Delta$ circuitry 10 during a transmit cycle. During the receive period following the transmitted pulse, the sum signal $\Sigma$ and the difference signals $\Delta_A$ and $\Delta_E$ are typically passed through receiver protector tubes $18a$, $18b$ and $18c$ and low-noise parametric amplifiers $20a$, $20b$, and $20c$ to establish a system noise figure. In a conventional manner, these mocrowave signals are converted to intermediate frequency (IF) signals by beating these signals in mixers $22a$, $22b$ and $22c$ with signals derived from a local oscillator 24. The resultant IF signals may be applied through suitable IF amplifiers $26a$, $26b$ and $26c$ to gates $28a$, $28b$ and $28c$, to respectively amplify and gate the signals. Up to this point, the three channels as indicated by the letters $a$, $b$ and $c$, are made as nearly identical as possible. The sum channel indicated by the letter $a$ contains, once the target track is established, the full target signal, whereas the two difference channels indicated by the letters $b$ and $c$ contain target signals $\Delta_A$ and $\Delta_E$ whose amplitude is a function of antenna angular pointing error. When the antenna is pointing directly at the target, no target signals exist in the $\Delta_A$ and $\Delta_E$ channels.

The signals developed at the gates $28b$ and $28c$ are applied to the synchronous detectors $30a$ and $30b$. As shown in FIG. 2, the signal derived from gate $28a$ is applied to the synchronous detectors $30a$ and $30b$ and also to an envelope detector 32. The synchronous detectors $30a$ and $30b$ provide error signals respectively indicative of the azimuth and elevation errors. The envelope detector provides a signal $\Sigma$ indicative of the range or velocity of the target. Since the full target amplitude appears in the sum channel, an AGC loop or circuit is connected as shown in FIG. 2. In particular, the AGC circuit from the envelope detector 32 includes a summer 34 for comparing the output signal $\Sigma$ with an AGC reference signal; the resultant signal which is applied to an amplifier 36. The output of the amplifier 36 is applied to the IF amplifiers $26a$, $26b$ and $26c$ to control the gain thereof. By carefully designing and constructing the two $\Delta$ channels to be nearly identical to the $\Sigma$ channel as possible, the developed AGC signal can be used to vary the $\Delta$ channels in a nearly identical manner. Thus, the proper sensitivity or scale factor may be maintained on the azimuth and elevation error signals. The developed azimuth and elevation error signals may then be applied to servo drive systems associated with the antenna 12 to null the detected error. In order to preserve the sense or direction information contained in the $\Delta$ channels, the $\Delta$ channels must be synchronously detected with the $\Sigma$ channel providing the necessary reference. Such a requirement restricts the allowable phase difference between the channels and it accounts for much of the complexity of a monopulse system.

In the prior art, monopulse radar systems have been suggested in which the number of channels required has been reduced. In U.S. Pat. No. 3,339,199, the number of channels in the receiver is reduced to a single channel. In particular, there is suggested an antenna array for generating four video signals which are applied to a sum and difference network to provide a sum signal, an azimuth difference signal and an elevation difference signal. The signals so derived from the sum and difference network are then converted to IF signals in a generally conventional heterodyning step using mixers and a local oscillator. Subsequent to the IF conversion, the resultant IF azimuth and elevation signals are modulated in quadrature. The modulated elevation and azimuth signals are added at a suitable junction. A 90° phase shift is imparted to the sum signal which is then added with the sum of the error signals to provide a composite sum signal. The composite signal is then passed through a limiting amplifier and a frequency discriminator; the resultant signal is then demodulated to provide the respective elevation and azimuth error signals.

Though the above-described system would have the advantage of reducing the number of channels required, this system would not be readily compatible with doppler radars. In particular, modulation and combination of IF signals are performed after heterodyning and preamplifying to permit splitting of the sum signal before the 90° phase shift. This technique requires the maintaining of the phase relationship between the various channels until at least after the error signals and sum signal have been added together. Further, the use of limiting, combined with a frequency discriminator, produces higher order sidebands and harmonics of the modulating signal. Further, it is fundamental to monopulse radar systems that amplitude variations in a target echo due to scintillation or jamming modulation will effect the $\Delta$ and $\Sigma$ channels by the same proportionality factor. It would be desirable to avoid these modulation errors. In particular, doppler radar systems are particularly susceptible to such errors and further are not adaptable to the techniques suggested in the above-identified patent.

SUMMARY OF THE INVENTION

It is therefore an object of this invention to provide a new and improved monopulse radar system in which the number of channels required is reduced.

It is a further object of this invention to provide a new and improved monopulse radar system compatible with doppler radar techniques.

It is a more particular object of this invention to provide a new and improved monopulse radar system by reducing the phase variations between the various channels and also by significantly reducing undesired modulation without incurring clutter spreading.

These and other objects are met in accordance with the teachings of this invention by providing a monopulse radar system comprising an antenna array, a sum and difference network for providing an azimuth difference signal, an elevation difference signal and a sum signal; a modulating circuit for modulating the azimuth difference and the elevation difference signal; a summing circuit for combining the modulated signals with a portion less than the whole of the sum signal to provide a composite signal modulated in amplitude whereby the modulation component includes terms proportional to the azimuth and elevation angles; demodulating circuits for receiving the composite signal for providing separate azimuth and elevation error signals; amplifying means for variably amplifying the sum signal and the composite signal; and a feedback circuit responsive to the amplfied sum signal for variably controlling the gain of the amplifying circuits. As a result, the amplitude variation in the signals derived from the antenna are substantially eliminated and the azimuth and elevation error signals are substantially immune to target or externally generated signal modulation.

In an illustrative embodiment of this invention, the modulating and summing of the azimuth, elevation and sum channels is carried out at microwave frequencies to provide a composite signal. Thereafter, the composite signal and the sum signal are converted in IF signals by heterodyning techniques involving a mixer and a local oscillator source.

BRIEF DESCRIPTION OF THE DRAWINGS

These and other objects and advantages of the present invention will become more apparent by referring to the following detailed description and the accompanying drawings, in which:

FIGS. 1 and 2 show diagramatically a monopulse radar system of the prior art;

FIG. 3 is a schematic representation of a portion of a monopulse radar system in accordance with the teachings of this invention;

FIGS. 5A, 5B, 5C, 5D and 5E are graphical representations of the signals developed within the circuits of FIGS. 3 and 4.

DETAILED DESCRIPTION OF THE PREFERRED EMBODIMENT

Figure 2:
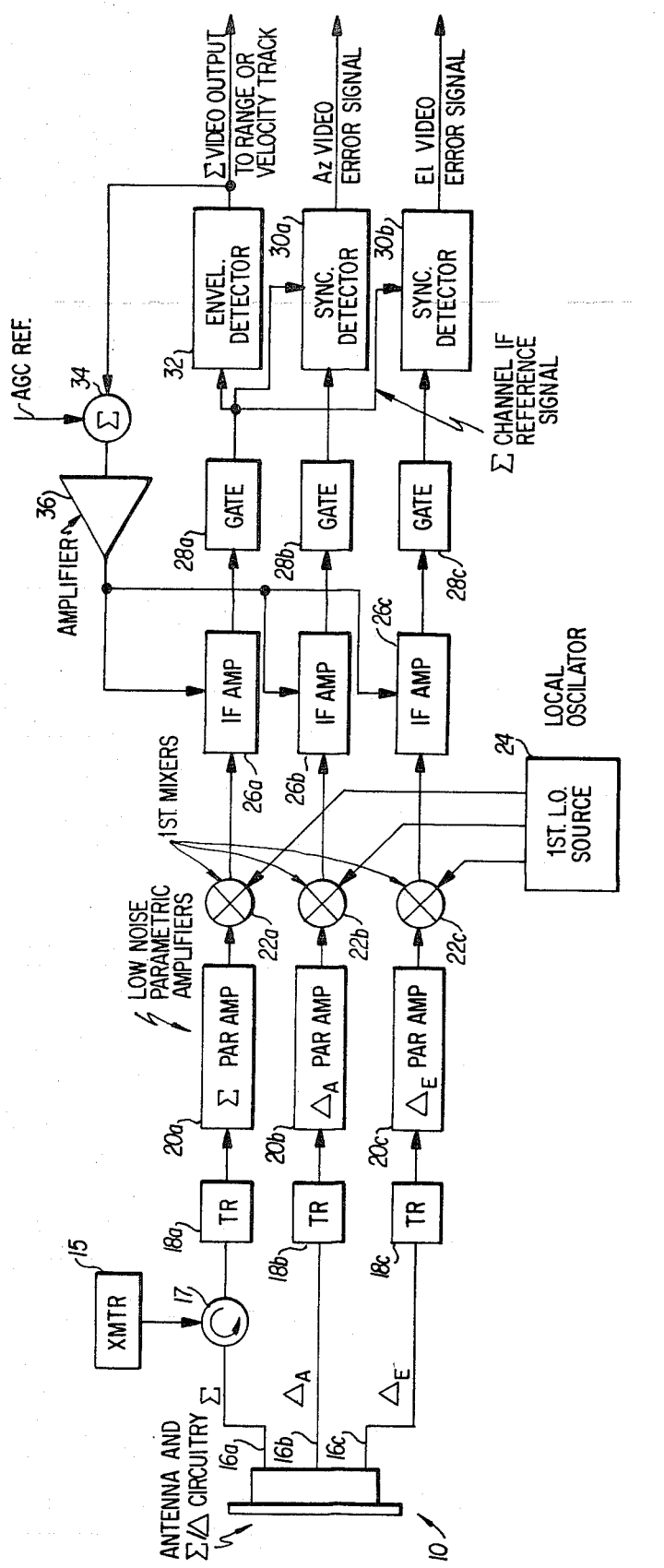

With reference to the drawings and in particular to FIG. 3, a front end assembly 110 is shown which is essentially similar to the assembly 10 shown in FIGS. 1 and 2. Illustratively, the front end assembly 110 includes an antenna array with four antenna elements or horns arranged in a similar manner to the elements of the antenna array 12 of FIG. 1. The antenna array generates four video signals which are applied to a sum and difference network, similar to that shown in FIG. 1, which illustratively includes four hybrid junctions, each having a pair of inputs and outputs and acting to deliver at its output, the sum indifference of the two signals applied to its inputs. In particular, the front end assembly 110 generates at its output terminals 116a, 116b and 116c a sum signal designated $V_\Sigma$, a first difference signal designated $V_{\Delta\ A}$, and a second difference signal designated $V_{\Delta\ E}$, respectively. The antenna array and the sum and difference network used to obtain the signals and comprising the front end assembly 110 are conventional circuits and thus have not been described in detail. It may be further understood that the three combination signals are similar to the basic signals of any sum and difference monopulse receiver, i.e., the sum signal $V_\Sigma$ is indicative of the target range or velocity; the difference signal $V_{\Delta\ A}$ is indicative of the azimuth error and the difference signal $V_{\Delta\ E}$ is indicative of the elevation error. More specifically, each of the three signals $V_\Sigma$, $V_{\Delta\ E}$, and $V_{\Delta\ A}$ is a simultaneous function of the angular displacement of the target from the boresight (reference axis of the antenna array) in azimuth, and of the angular target displacement of the target in elevation.

A signal from the radar transmitter 118 is fed through the $\Sigma$ channel to the antenna array by a conventional circulator or duplexer 117. The received sum signal $V_\Sigma$ is fed through the circulator 117 and into a directional coupler 150. The azimuth and elevation difference signals $V_{\Delta A}$, $V_{\Delta E}$, however, are applied to amplitude modulators 140a and 140b. A spin reference generator 142 provides sine and cosine signals of a selected lobing frequency $\omega_L$ to be applied to the modulators 140a and 140b, respectively, to modulate the azimuth and elevation signals $V_{\Delta A}$ and $V_{\Delta E}$. The modulated azimuth signal ($V_{\Delta A} \sin 107_L t$) and the modulated elevation signal ($V_{\Delta E} \cosine \omega_L t$) are summed together by a coupler 144. The unused terminal of the coupler 144 may be terminated in an impedance 146. Assuming a $-3$ dB coupler 144, the resultant signal derived from the coupler 144 would be 0.707 [$V_{\Delta A} \sin \omega_L t^\tau + V_{\Delta F} \cosine \omega_L t$].

A portion of the sum signal $V_\Sigma$ is derived from the $\Sigma$ channel by the directional coupler 150. That signal derived from the coupler 150 has an amplitude less than the signal $V_\Sigma$ derived from the output terminal 116a (e.g., for the $-4$ dB coupler shown, the output is 0.63 of the input) and is combined with the modulated azimuth and elevation signals by a coupler 148 to provide a composite signal indicative of the azimuth and elevation angle errors. Thus, one channel of a monopulse radar system that would normally be required has been eliminated. The composite signal may be represented as follows:

0.707 [0.63 $V_\Sigma$ + 0.707 ($V_{\Delta A} \sin \omega_L t + V_{\Delta E} \cos \omega_L t$)]

FIGS. 5A–5E illustrate the nature of the signals derived from the circuit shown in FIG. 3. Assuming an antenna azimuth pointing error $\Delta \theta_A$, an azimuth error signal $V_{\Delta A}$ will be generated as shown in FIG. 5A upon the output terminal 116b. The azimuth error signal $V_{\Delta A}$ may be represented as:

$V_{\Delta A} = \Delta V_A \sin \omega_c t$, where $\omega_c$ is the microwave carrier frequency. As explained above, the azimuth error signal $V_{\Delta A}$ would be modulated with a lobing reference signal $\sin \omega_L t$ shown in FIG. 5B. In practice, the frequency of $\omega_L$ would be much lower than that of $\omega_c$. The amplitude modulated azimuth signal is shown in FIG. 4C and may be represented as follows:

0.5 [$\Delta V_A \sin \omega_c t$] [$\sin \omega_L t$]

As noted in FIG. 5C, the amplitude modulated azimuth signal is a double sideband, suppressed carrier signal with a phase reversal occurring when $\sin \omega_L t$ changes sign. FIG. 5D represents that fraction of the $\Sigma$ channel signal attained from the directional coupler 150 and attenuated by coupler 148 and may be represented by the following:

0.45 $V_\Sigma \sin \omega_c t$.

The sum of this fractional $\Sigma$ signal and the modulated azimuth signal is shown in FIG. 5E; the resulting signal is a conventional amplitude modulated signal containing a carrier and two sidebands. The effect of adding the attenuated or fractional $\Sigma$ channel signal $V_\Sigma$ was to reinsert the carrier signal. The envelope of the signal shown in FIG. 5E is a sinewave of frequency $\omega_L$ whose amplitude is directly proportional to the azimuth angular error $\Delta \theta_A$. The modulation of this signal can be easily extracted by merely envelope detecting this signal. A substantially identical process is used for detecting the elevation angle error $\Delta \theta_E$ and except that the lobing modulation is applied in phase quadrature (i.e., the modulating signal is $\cos \omega_L t$), thus permitting both the azimuth and elevation signals to be combined in a signal channel and separated later by angle track demodulators.

Figure 4:
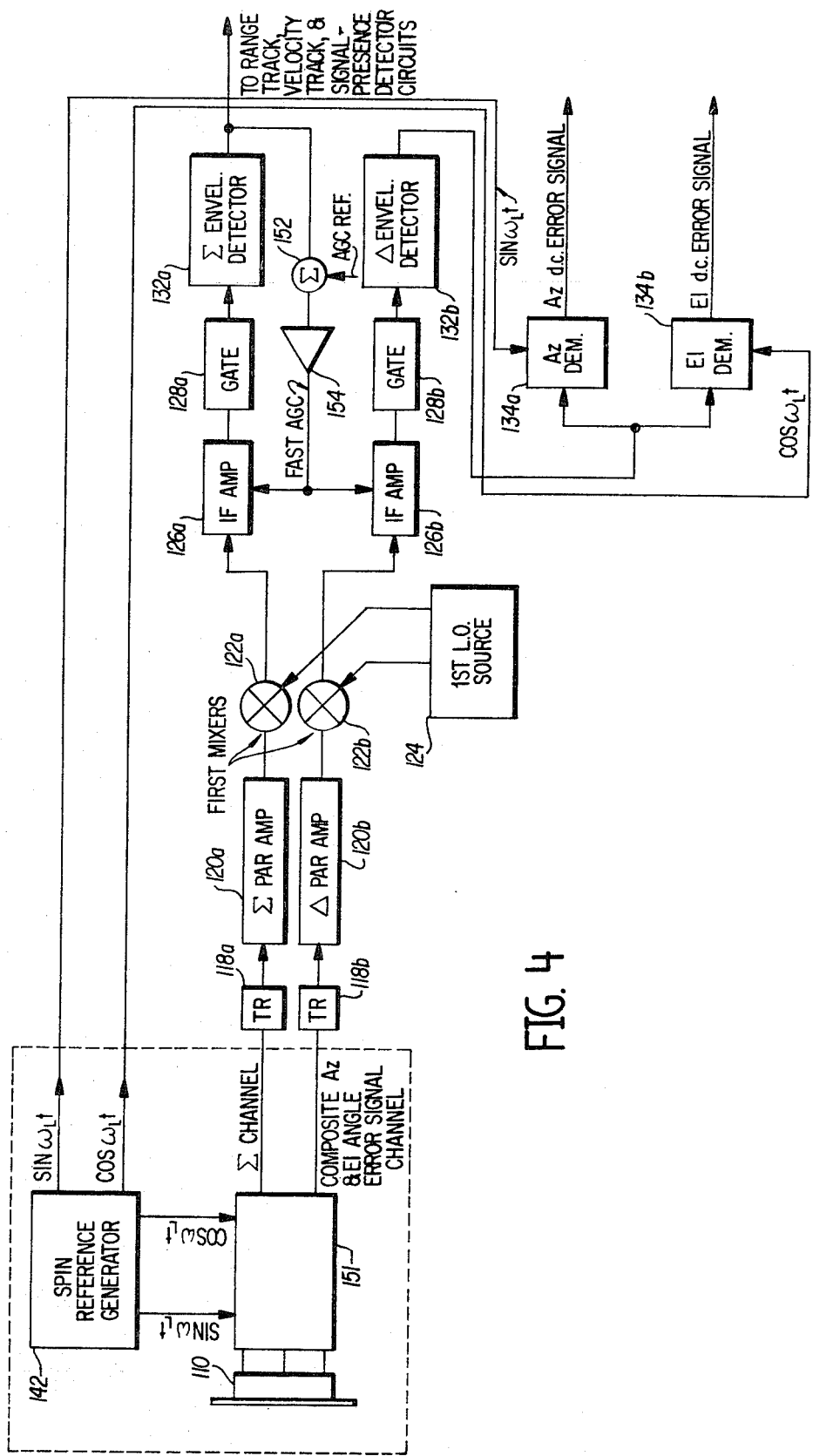
FIG. 4 is a schematic representation of the monopulse radar system in accordance with the teachings of this invention.

With regard to FIG. 4, there is shown a schematic representation of the entire monopulse receiver system in accordance with the teachings of this invention. The modulation circuitry 151, as shown in FIG. 3, is incorporated into the circuit of FIG. 4 and is identified by the numeral 151. By so combining the azimuth and elevation error signals to form a composite error signal, only two channels are thereafter required instead of three. As a result, control of the microwave and IF phase shift between the two channels is no longer needed, since the desired information is completely contained within the envelope of the composite signal. As indicated in FIG. 4, the composite signal and the $\Sigma$ signal are applied through receiver protector tubes 118a and 118b to the low noise parametric amplifiers 120a and 120b. The amplified signals are applied with local oscillator signals derived from source 124, to mixers 122a and 122b to provide corresponding IF signals. The resultant IF signals are directed through variable gain IF amplifiers 126a and 126b to gates 128a and 128b, for successive amplification and target selection gating.

The envelope of the composite signal derived from gate 128 is a sine wave of frequency $\omega_L$, whose amplitude and phase are directly related to the azimuth and elevation angle errors. The composite signal is then applied to the envelope detector 132b to provide a signal corresponding to the envelope of the input signal. To separate the azimuth and elevation components of the composite signal, the composite signal derived from the envelope detector 132b is applied to the demodulator circuits 134a and 134b, to be respectively demodulated in accordance with the $\sin \omega L t$ and $\cos \omega L t$ lobing reference signals. Since the demodulators 134a and 134b reject the other quadrature phase signal, the resultant AZ and EL angular error signals are easily derived distinct from each other and may be applied to respective servo drives to reorient the antenna array to null the error signals.

In accordance with a significant aspect of this invention, the sum signal $\Sigma$ derived from the envelope detector 132a is applied to an AGC feedback circuit to control the gain of the IF amplifiers 126a and 126b. In particular, the sum signal $\Sigma$ is applied to a summer 152, where the sum signal $\Sigma$ is compared to an AGC reference signal with the resultant output applied to and amplified by an amplifier 154. The output signal derived from the amplifier 154 is applied to both the IF amplifiers 126a and 126b to vary the gain of the amplifiers 126a and 126b and therefore the amplitude of the sum and composite signals directed therethrough.

In a monopulse antenna, amplitude variations in the target echo due to scintillation or jamming modulation will effect both the $\Sigma$ and $\Delta$ channels by the same proportionality factor. For example, an increae in signal strength of 10 dB will cause both the $\Sigma$ and $\Delta$ signals to increase by a like factor of 10 dB. Thus, in accordance with the teachings of this invention, the AGC circuit senses these amplitude variations in the $\Sigma$ channel and varies the gain of the amplifiers 126a and 126b (associated with both the $\Sigma$ and composite channels) in an inverse manner. If a "fast" AGC circuit is used, i.e., an AGC circuit, whose response time is small compared to a period of the lobing frequency $\omega_L$, the amplitude of the resulting $\Sigma$ signal can be made substantially constant over the range of amplitude modulation frequencies to which the angle error demodulators are sensitive. Since the composite channel is also connected to the feedback circuit, the composite signal will similarly be independent of such target generated amplitude fluctuations. As a result, the AZ and El error signals derived from the system as shown in FIG. 4 are immune to target or externally generated signal modulation.

Thus, there has been shown a monopulse radar system employing two instead of three receiving channels. As a result, the critical phase balancing is no longer required after the elevation and azimuth signals have been combined at the microwave signal mixer. Further, by adding only a portion of the sum signal to the azimuth and elevation signals, the splitting is carried out at microwave frequencies prior to any preamplification, thus avoiding the unpredictable phase variations associated with low-noise parametric amplifiers and IF preamplifiers. Further, the monopulse radar system of this invention utilizes a fast AGC circuit to vary the gain of not only the Σ signal, but also of the composite signal to thereby eliminate the effect of amplitude scintillation noise or external ECM repeaters. In doppler radar systems this has a particular advantage, since the fast AGC circuit can be applied subsequent to doppler filtering. Further, the radar system in accordance with the teachings of this invention makes use of a pure sinusoidal lobing modulator, as opposed to phase modulators, thus avoiding the higher frequency harmonic modulation and consequent clutter spreading associated with other types of monopulse systems which use modulation techniques. Further, this system permits target tracking without excessive phase error in doppler radars when the target frequency is adjacent to very sharp clutter rejection filters whose phase match is difficult to control. Further, this radar system is compatible with multimode radars using various combinations of high PRF, medium PRF, low PRF, pulse compression and non-coherent pulse modes. The system in accordance with teachings of this invention eliminates undesired conical scan modulation on the transmitter radar signal, thus removing this type of modulation as a source of spurious signal when a radar is used for semi-active missile illumination. Further, this system is fully compatible with rapid frequency diversity techniques since no RF phase matching or balancing is required between the parametric amplifiers and mixers of the system.

The sum channel output provides an error signal for range tracking, velocity tracking, and signal-presence detection which has no angle modulation superimposed on it. In some antenna designs, the sum channel has lower sidelobe levels than the difference channels, which allows improved range and velocity tracking and signal detection in the presence of sidelobe clutter or jamming.

Numerous changes may be made in the above-described apparatus and different embodiments of the invention may be made without departing from the spirit thereof; therefore, it is contended that all matter contained in the foregoing description and shown in accompanying drawings, shall be interpreted as illustrative and not in a limiting sense.

What is claimed is:

1. In a monopulse radar receiver system comprising an antenna having an axis, and network means coupled to the antenna for providing an azimuth difference signal indicative of the azimuth error angle between the axis and the detected target, an elevation difference signal indicative of the elevation error angle between the axis and the detected target, and a sum signal, the improvement comprising:
   reference means for providing first and second reference signals in quadrature with each other;
   first and second modulators for receiving and modulating respectively the azimuth difference signal and the elevation difference signal in accordance with the first and second reference signals;
   summing means for combining the modulated azimuth and elevation difference signals and a derived signal of $n$ percent of the sum signal, where $n$ percent is less than 100 percent to produce a composite signal whose amplitude modulation components comprise terms indicative of the azimuth and elevation error angles;
   first and second amplifier means each having a variable gain, for receiving and variably amplifying the amplitude of the composite signal and the sum signal respectively;
   demodulator means for receiving and demodulating the composite signal in accordance with the first and second reference signals to provide first and second error signals indicative respectively of the azimuth and elevation error angles; and
   control circuit means responsive to the amplified sum signal to control the gain of said first and second amplifier means inversely as a function of the amplitude of the amplified sum signal.

2. In a monopulse radar receiver system as claimed in claim 1, said reference means is adapted to provide the first reference signal in the form of sine $\omega_L t$ and the second reference signal in the form of cos $\omega_L t$, where $\omega_L$ is a selected reference frequency.

3. In a monopulse radar receiver system as claimed in claim 2, wherein said reference means is adapted such that $\omega_L$ is less than the frequency $\omega_c$ of the carrier signal of the radar system.

4. In a monopulse radar receiver system as claimed in claim 1, envelope detector means for receiving the composite signal and for providing an output signal indicative of the envelope thereof.

5. In a monopulse radar receiver system as claimed in claim 4, second envelope detector means for receiving the sum signal and for providing a second output signal indicative of the envelope thereof.

6. In a monopulse radar receiver system as claimed in claim 1, wherein there is included coupler means associated with the network means for providing the derived signal.

7. In a monopulse radar receiver system as claimed in claim 6, wherein said summing means includes a first coupler for combining the modulated azimuth and elevation error signals to provide an intermediate signal indicative thereof and a second coupler for combining the intermediate signal and the derived signal to provide the composite signal.

8. In a monopulse radar receiver system as claimed in claim 7, wherein there is further included conversion means coupled to said second coupler for converting the composite signal from microwave to intermediate frequencies.

* * * * *